United States Patent
Coronato et al.

(10) Patent No.: US 8,413,506 B2
(45) Date of Patent: *Apr. 9, 2013

(54) MICROELECTROMECHANICAL GYROSCOPE WITH ROTARY DRIVING MOTION AND IMPROVED ELECTRICAL PROPERTIES

(75) Inventors: Luca Coronato, Corsico (IT); Gabriele Cazzaniga, Rosate (IT); Sarah Zerbini, Cornaredo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 703 days.

This patent is subject to a terminal disclaimer.

(21) Appl. No.: 12/626,433

(22) Filed: Nov. 25, 2009

(65) Prior Publication Data

US 2010/0126269 A1    May 27, 2010

(30) Foreign Application Priority Data

Nov. 26, 2008 (IT) .............................. TO2008A0876

(51) Int. Cl.
*G01C 19/56* (2012.01)
(52) U.S. Cl.
USPC ...................................................... 73/504.12
(58) Field of Classification Search ............... 73/504.12, 73/504.14
See application file for complete search history.

(56) References Cited

U.S. PATENT DOCUMENTS

| 5,728,936 | A | 3/1998 | Lutz | 73/504.14 |
| 5,895,850 | A | 4/1999 | Buestgens | |
| 6,230,563 | B1 | 5/2001 | Clark et al. | 73/504.04 |
| 6,250,156 | B1 | 6/2001 | Seshia et al. | |
| 6,349,597 | B1 | 2/2002 | Folkmer et al. | |
| 6,520,017 | B1 | 2/2003 | Schoefthaler et al. | |
| 6,766,689 | B2 | 7/2004 | Spinola Durante et al. | |
| 7,155,976 | B2 | 1/2007 | Kai-Cheng et al. | |

(Continued)

FOREIGN PATENT DOCUMENTS

| DE | 102007012163 | 10/2007 |
| DE | 102006046772 A1 | 4/2008 |

(Continued)

OTHER PUBLICATIONS

Cazzaniga, G. et al., "Integrated Microelectromechanical Gyroscope With Improved Driving Structure," U.S. Appl. No. 12/975,979, filed Dec. 22, 2010, 34pgs.

(Continued)

*Primary Examiner* — John Chapman, Jr.
(74) *Attorney, Agent, or Firm* — Seed IP Law Group PLLC

(57) ABSTRACT

An integrated microelectromechanical structure is provided with: a die, having a substrate and a frame, defining inside it a detection region and having a first side extending along a first axis; a driving mass, anchored to the substrate, set in the detection region, and designed to be rotated in a plane with a movement of actuation about a vertical axis; and a first pair and a second pair of first sensing masses, suspended inside the driving mass via elastic supporting elements so as to be fixed with respect thereto in the movement of actuation and so as to perform a detection movement of rotation out of the plane in response to a first angular velocity; wherein the first sensing masses of the first pair and the first sensing masses of the second pair are aligned in respective directions, having non-zero inclinations of opposite sign with respect to the first axis.

23 Claims, 7 Drawing Sheets

U.S. PATENT DOCUMENTS

| | | |
|---|---|---|
| 7,454,246 B2 | 11/2008 | Merfeld |
| 7,461,552 B2 | 12/2008 | Acar |
| 7,513,155 B2 | 4/2009 | Jeong et al. |
| 8,256,290 B2 | 9/2012 | Mao |
| 2002/0183899 A1 | 12/2002 | Wallner ............................ 701/1 |
| 2002/0189351 A1 | 12/2002 | Reeds et al. |
| 2002/0189352 A1 | 12/2002 | Reeds, III et al. |
| 2002/0189353 A1 | 12/2002 | Knowles et al. |
| 2003/0164040 A1 | 9/2003 | Willig et al. |
| 2004/0211257 A1 | 10/2004 | Geen ......................... 73/504.04 |
| 2004/0211258 A1 | 10/2004 | Geen |
| 2005/0050954 A1 | 3/2005 | Chaumet et al. ........... 73/504.12 |
| 2005/0229703 A1 | 10/2005 | Geen et al. |
| 2006/0032310 A1 | 2/2006 | Merassi et al. |
| 2006/0112764 A1 | 6/2006 | Higuchi |
| 2006/0272411 A1 | 12/2006 | Acar et al. |
| 2007/0062282 A1 | 3/2007 | Akashi et al. |
| 2007/0214883 A1 | 9/2007 | Durante et al. |
| 2007/0289382 A1 | 12/2007 | Caminada et al. |
| 2008/0115562 A1 | 5/2008 | Haino et al. |
| 2008/0190200 A1 | 8/2008 | Caminada et al. |
| 2008/0276706 A1 | 11/2008 | Hartmann et al. ......... 73/504.04 |
| 2009/0064780 A1 | 3/2009 | Coronato et al. |
| 2009/0100930 A1 | 4/2009 | Coronato et al. |
| 2010/0116050 A1 | 5/2010 | Wolfram |
| 2010/0126272 A1 | 5/2010 | Coronato et al. .......... 73/504.14 |
| 2010/0132463 A1 | 6/2010 | Caminada et al. ......... 73/504.12 |
| 2010/0154541 A1 | 6/2010 | Cazzaniga et al. ......... 73/504.12 |
| 2010/0186507 A1 | 7/2010 | Günthner et al. |
| 2010/0281977 A1 | 11/2010 | Coronato et al. .......... 73/504.14 |
| 2011/0030473 A1 | 2/2011 | Acar |
| 2011/0061460 A1 | 3/2011 | Seeger et al. |
| 2012/0060604 A1 | 3/2012 | Neul et al. |

FOREIGN PATENT DOCUMENTS

| | | |
|---|---|---|
| DE | 102007054505 A1 | 5/2009 |
| EP | 1619471 A1 | 1/2006 |
| EP | 1624286 | 2/2006 |
| EP | 1832841 A1 | 9/2007 |
| JP | 2005/241500 | 9/2005 |
| WO | 2006/043890 | 4/2006 |
| WO | 2007086849 A1 | 8/2007 |
| WO | 2007/145113 | 12/2007 |
| WO | 2009/033915 | 3/2009 |
| WO | 2009/087858 | 7/2009 |

OTHER PUBLICATIONS

Schofield, A.R. et al., "Multi-Degree of Freedom Tuning Fork Gyroscope Demonstrating Shock Rejection," IEEE Sensors 2007 Conference, Atlanta, Georgia, Oct. 28-31, 2007, pp. 120-123.

MICROELECTROMECHANICAL GYROSCOPE WITH ROTARY DRIVING MOTION AND IMPROVED ELECTRICAL PROPERTIES

BACKGROUND

1. Technical Field

The present disclosure relates to a microelectromechanical structure, in particular a biaxial or triaxial gyroscope, provided with a rotary driving movement and improved electrical characteristics, in particular in terms of sensitivity in the detection of angular velocities.

2. Description of the Related Art

As is known, micromachining techniques enable manufacturing of microelectromechanical structures or systems (MEMS) within layers of semiconductor material, which have been deposited (for example, a polycrystalline-silicon layer) or grown (for example, an epitaxial layer) on sacrificial layers, which are removed via chemical etching.

Inertial sensors, accelerometers, and gyroscopes obtained with this technology are having an increasing success, for example, in the automotive field, in inertial navigation, or in the field of portable devices.

In particular, known to the art are integrated gyroscopes made of semiconductor material obtained with MEMS technology. These gyroscopes operate on the basis of the theorem of relative accelerations, exploiting the Coriolis acceleration. When an angular velocity is applied to a mobile mass that moves at a linear velocity, the mobile mass "feels" an apparent force, referred to as "Coriolis force", which causes a displacement thereof in a direction perpendicular to the direction of the linear velocity and to the axis about which the angular velocity is applied. The mobile mass is supported via springs that enable a displacement thereof in the direction of the apparent force. On the basis of Hooke's law, the displacement is proportional to the apparent force, in such a way that from the displacement of the mobile mass it is possible to detect the Coriolis force and the value of the angular velocity that has generated it. The displacement of the mobile mass can, for example, be detected in a capacitive way by determining, in resonance conditions, the variations of capacitance caused by the movement of mobile electrodes, fixed with respect to the mobile mass and combfingered with fixed electrodes.

The published US patent applications US 2007/0214883, US 2009/0064780, and US 2009/0100930, filed by the applicant of the present application, disclose an integrated microelectromechanical sensor with rotary driving movement and sensitive to angular velocities of pitch, roll, and yaw about respective axes of detection.

This microelectromechanical sensor comprises a single driving mass, anchored to a substrate in a single central point, and actuated with rotary motion about an axis passing through the central point and orthogonal to the plane of the driving mass. The movement of rotation of the driving mass makes it possible to obtain in the plane of the mass two components of driving velocity orthogonal with respect to one another. Through openings are provided within the driving mass, and corresponding sensing masses are arranged in the through openings; the sensing masses are enclosed in the overall dimensions of the driving mass, are suspended with respect to the substrate, and are connected to the driving mass via flexible elements. Each sensing mass is fixed with respect to the driving mass during its rotary motion, and has a further degree of freedom of movement as a function of an external stress, in particular a Coriolis force, acting on the sensor. The flexible elements, thanks to their particular construction, enable the sensing masses to perform a rotary movement of detection about an axis belonging to the plane of the sensor, or alternatively a linear movement of detection along an axis belonging to the plane of the sensor, respectively, in response to a Coriolis acceleration acting in a direction perpendicular to the plane and to a Coriolis acceleration acting in a direction belonging to the plane. The movement of detection is in any case substantially decoupled from the movement of actuation of the driving mass. This microelectromechanical structure, in addition to being compact (in so far as it envisages a single driving mass enclosing in its overall dimensions a number of sensing masses), makes it possible to obtain with minor structural modifications, a uniaxial, biaxial, or triaxial gyroscope (and/or possibly an accelerometer, according to the electrical connections implemented), at the same time ensuring an excellent decoupling of the driving dynamics from the detection dynamics.

FIG. 1 shows an exemplary embodiment of a triaxial microelectromechanical gyroscope, designated by 1, according to the teachings contained in the aforesaid patent applications.

The gyroscope 1 is made in a die 2, comprising a substrate 2a made of semiconductor material (for example, silicon), and a frame 2b defining inside it an open region 2c; the open region 2c overlies the substrate 2a, and is designed to house detection structures of the gyroscope 1 (as described in detail hereinafter). The open region 2c has a generally square or rectangular configuration in a horizontal plane (in what follows, plane of the sensor xy), defined by a first horizontal axis x and a second horizontal axis y, fixed with respect to the die 2. The frame 2b has sides that are substantially parallel to the horizontal axes x, y. Contact pads 2d (so-called "die pads") are arranged along a side of the frame 2b, aligned, for example, along the first horizontal axis x. In a way not illustrated, the die pads 2d enable electrical contact from outside of the detection structures of the gyroscope 1. The die pads 2d have an axis of symmetry, in this case coinciding with the second horizontal axis y (orthogonal to their direction of alignment), and are arranged in equal number and in a specular way on opposite sides of the second horizontal axis y.

In particular, the first and second horizontal axes x, y correspond to a first axis of detection and to a second axis of detection of the gyroscope 1 (more precisely, to a pitch axis and to a roll axis), about which corresponding pitch and roll angular velocities $\vec{\Omega}_x$ and $\vec{\Omega}_y$ are detected.

In detail, the gyroscope 1 comprises a driving structure, housed within the open region 2c and including a driving mass 3 and a driving assembly 4.

The driving mass 3 has a generally circular geometry with radial symmetry, with a substantially planar configuration having a main extension in the plane of the sensor xy, and a negligible dimension, with respect to the main extension, in a direction parallel to a vertical axis z, forming with the first and second horizontal axes x, y a set of three orthogonal axes, fixed with respect to the die 2. For example, the driving mass 3 has in the plane of the sensor xy basically the shape of an annulus, and defines at the center an empty space 6, the center O of which coincides with the center of gravity and the center of symmetry of the entire structure.

The driving mass 3 is anchored to the substrate 2a by means of a first anchorage 7a set in an area corresponding to the center O, to which it is connected through first elastic anchorage elements 8a. In the example, the first elastic anchorage elements 8a depart, forming a cross, from the center O, parallel to the first and second horizontal axes x, y.

The driving mass 3 is anchored to the substrate 2a by means of further anchorages 7b, set on the outside of the same driving mass 3, to which it is connected by means of further elastic anchorage elements 8b. For example, the further elastic anchorage elements 8b are of the folded type, are four in number, and are set aligned in pairs along the first and second horizontal axes x, y; accordingly, the further anchorages 7b are arranged, in pairs, on opposite sides of the driving mass 3 with respect to the empty space 6, at the ends of a cross centered in the center O. The first and further elastic anchorage elements 8a, 8b enable a rotary movement of the driving mass 3 about an axis of actuation passing through the center O, parallel to the vertical axis z and perpendicular to the plane of the sensor xy.

The driving mass 3 has: a first pair of first through openings 9a, 9b, aligned in a diametric direction along the first horizontal axis x (pitch axis), and set on opposite sides with respect to the empty space 6; and a second pair of first through openings 9c, 9d, aligned in a diametric direction along the second horizontal axis y (roll axis), and set on opposite sides with respect to the empty space 6. In particular, each of the first through opening 9a-9d has in the plane of the sensor xy the shape of a radial sector of an annulus, having arc-shaped internal and external sides and radially-extending lateral sides. In addition, the through openings 9a, 9b of the first pair are symmetrical with respect to the second horizontal axis y, and the through openings 9c, 9d of the second pair are symmetrical with respect to the first horizontal axis x. Moreover, the driving mass 3 has a pair of second through openings 26a, 26b, having in plan view a substantially rectangular shape, aligned in a radial direction (in the example of FIG. 1 in a direction inclined by 45° with respect to the first horizontal axis x or the second horizontal axis y), and having a main extension in the same radial direction.

The driving assembly 4 comprises a plurality of driven arms 10, extending externally from the driving mass 3 in a radial direction and in such a way that they are set at equal angular distances apart, and a plurality of first and second driving arms 12a, 12b, which extend parallel to, and on opposite sides of, respective driven arms 10. Each driven arm 10 carries a plurality of first electrodes 13, extending perpendicular to, and on either side of, the same driven arm. In addition, each of the first and second driving arms 12a, 12b carries respective second driving electrodes 14a, 14b, which extend towards the respective driven arm 10 and are combfingered with the corresponding first electrodes 13. The first driving arms 12a are arranged all on one and the same side of the respective driven arms 10, and are biased all at one and the same first voltage. Likewise, the second driving arms 12b are arranged all on the opposite side of the respective driven arms 10, and are biased all at one and the same second voltage. A driving circuit (not illustrated) is connected to the second electrodes 14a, 14b for applying the first and second voltages and determining, by means of the mutual and alternating attraction of the electrodes, an oscillatory rotary movement of the driving mass 3 about the axis of actuation, at a given frequency of oscillation.

The gyroscope 1 further comprises a first pair of acceleration sensors with axis parallel to the vertical axis z, and in particular a first pair of first sensing masses 16a, 16b, set within a respective first through opening 9a, 9b so as to be completely enclosed and contained within the overall dimensions of the driving mass 3 in the plane of the sensor xy. Each of the first sensing masses 16a, 16b has a shape corresponding to that of the respective through opening, and consequently has, in a plan view, the general shape of a radial annulus sector. In detail, each of the first sensing masses 16a, 16b has a first portion 17, which is wider, and a second portion 18, which is narrower (along the first horizontal axis x), these portions being connected by a connecting portion 19, which is shorter (in a direction parallel to the second horizontal axis y) than the first and second portions 17, 18, and consequently has a center of gravity G located within the corresponding first portion 17. In greater detail, the first portion 17 has an outer side that is arc-shaped and concave, and radially-extending lateral sides, and the second portion 18 has an outer side that is arc-shaped and convex and radially-extending lateral sides, aligned along the lateral sides of the first portion 17. Each of the first sensing masses 16a, 16b is supported by a pair of first elastic supporting elements 20, extending from the connecting portion 19 to the driving mass 3, connecting thereto, parallel to the second horizontal axis y. The first elastic supporting elements 20 extend within recesses 21 provided on opposite sides of the corresponding first sensing mass 16a, 16b, at a distance from its center of gravity G. The first elastic supporting elements 20 form torsional springs which are rigid in regard to the rotary motion of the driving mass 3 (so that the first sensing masses 16a, 16b follow the driving mass 3 in its motion of actuation), and moreover enable rotation of the first sensing masses about an axis of rotation parallel to the second horizontal axis y and belonging to the plane of the sensor xy, and hence their movement out of the plane of the sensor xy (a movement that is not, instead, allowed for the driving mass 3).

The gyroscope 1 further comprises a second pair of acceleration sensors with axis parallel to the vertical axis z, and in particular a second pair of first sensing masses 16c, 16d, housed within the through openings 9c, 9d, and completely enclosed and contained by the driving mass 3. The first sensing masses 16c, 16d are obtained from the rotation through 90° of the first sensing masses 16a, 16b with respect to the center O, and consequently the corresponding elastic supporting elements 20 extend parallel to the first horizontal axis x and enable rotation out of the plane of the sensor xy, about an axis of rotation parallel to the first horizontal axis x.

A pair of first and second sensing electrodes 22, 23 is set underneath the first and second portions 17, 18 of each of the first sensing masses 16a-16d. The first and second sensing electrodes 22, 23 are made of polycrystalline-silicon regions formed on the substrate 2a and having a substantially trapezoidal shape and dimensions substantially corresponding to those of the second portion 18. The first and second sensing electrodes 22, 23 are separated, respectively, from the first and second portions 17, 18, by an air gap, and hence form, together with the first and second portions 17, 18, respective sensing capacitors. The first and second sensing electrodes 22, 23 are connected to a read circuit of the gyroscope 1 (not illustrated) via the connection pads 2d.

The gyroscope 1 further comprises a pair of second sensing masses 25a, 25b housed within the second through openings 26a, 26b. The second sensing masses 25a, 25b have a generally rectangular shape with sides parallel to corresponding sides of the second through openings 26a, 26b, are suspended with respect to the substrate 2a, and are connected to the driving mass 3 via second elastic supporting elements 28. The second elastic supporting elements 28 depart, for example, from a point set approximately at the center of the minor sides of the second sensing masses, in the radial direction. In particular, the second elastic supporting elements 28 are rigid with respect to the motion of actuation of the driving mass 3 (in such a way that the second sensing masses 25a, 25b follow the driving mass 3 in its rotary movement), and moreover enable a linear movement of the respective second sensing masses in the aforesaid radial direction. In addition, the second sensing masses 25a, 25b have prolongations 29 extending, for example, starting from a point set approximately at the center of corresponding major sides, in a direction orthogonal to the radial direction. These prolongations 29 form sensing capacitors with plane and parallel faces with fixed electrodes anchored to the substrate, set facing, and parallel to, the same prolongations 29. For example, from each major side of each second sensing mass 25a, 25b departs a respective prolongation 29, which faces, and is set between, two fixed electrodes. In a way similar to what has been described previously, the fixed electrodes set in a radially more external position with respect to the center O are defined as "first sensing electrodes 22", and the fixed electrodes set in a radially more internal position are defined as "second sensing electrodes 23".

In use, the gyroscope 1 is able to operate as a triaxial gyroscope, and to detect a pitch angular velocity $\vec{\Omega}_x$ about the first horizontal axis x, a roll angular velocity $\vec{\Omega}_y$ about the second horizontal axis y, and a yaw angular velocity $\vec{\Omega}_z$ about the vertical axis z.

With reference also to FIG. 2, the rotary movement of the driving mass 3 and of the first sensing masses 16a-16d about the axis of actuation can be represented by a driving-velocity vector $\vec{v}_a$, tangential to the circumference describing the path thereof. In particular, the rotary motion about the first horizontal axis x or the second horizontal axis y with angular velocity $\vec{\Omega}_x$, $\vec{\Omega}_y$ causes a Coriolis force (designated by $\vec{F}_C$) acting on the entire structure, proportional to the vector product between the angular velocity $\vec{\Omega}_x$, $\vec{\Omega}_y$ and the driving velocity $\vec{v}_a$, and hence directed along the vertical axis z. On the entire structure, considered as a single rigid body, it is hence possible to identify a distribution of Coriolis forces, the value of which increases as the distance from the center O increases. The resultants of the Coriolis force $\vec{F}_C$ acting on the first sensing masses 16a-16d at the corresponding center of gravity G, cause rotation of the first sensing masses, which move out of the plane of the sensor xy, about an axis parallel to the first horizontal axis x or the second horizontal axis y and passing through the first elastic supporting elements 20. This movement is allowed by the torsion of the first elastic supporting elements 20. Instead, the configuration of the first and further elastic anchorage elements 8a, 8b is such as to inhibit, to a good approximation, the movement of the driving mass 3 out of the plane of the sensor xy, in this way enabling the effective decoupling of the motion of detection of the sensing masses with respect to that of actuation. The displacement of the first sensing masses 16a-16d out of the plane of the sensor xy causes a differential capacitive variation of the sensing capacitors, the value of which is proportional to the angular velocity $\vec{\Omega}_x$, $\vec{\Omega}_y$, which can thus be determined, via an appropriate read circuit, operating according to a differential scheme.

In particular, since the reading scheme is differential, the configuration in pairs of the first sensing masses 16a-16d enables automatic rejection of linear spurious accelerations along the vertical axis z. In addition, a rotation about the first horizontal axis x is not felt by the second pair of first sensing masses 16c, 16d, in so far as the resultant Coriolis force $\vec{F}_C$ is zero (since the vector product between the angular velocity $\vec{\Omega}_x$ and the corresponding driving velocity $\vec{v}_a$ goes to zero). Likewise, the rotation about the second horizontal axis y is not felt for similar reasons by the first pair of first sensing masses 16a, 16b so that the two axes of detection are not affected and are substantially decoupled.

With reference to FIG. 3, an angular velocity $\vec{\Omega}_z$ to be detected, acting about the vertical axis z, generates a Coriolis force $\vec{F}_C$ on the second sensing masses 25a, 25b set in a radial direction (hence directed as a centrifugal force acting on the same masses), causing displacement of the second sensing masses and a capacitive variation of the corresponding sensing capacitors. The value of the capacitive variation is proportional to the angular velocity $\vec{\Omega}_z$, which can be determined, via the read circuit, operating again according to a differential scheme.

Advantageously, the particular conformation of the first sensing masses 16a-16d enables an increase in the sensitivity of the gyroscope 1 (as compared to the use of other geometries for the same first sensing masses). In particular, the corresponding center of gravity G is positioned at a distance from the first elastic supporting elements 20 (and the corresponding axis of rotation out of the plane of the sensor xy) that is greater than that of the center of gravity of any rectangular mass that can be inscribed in one and the same sector of the driving mass 3 and is supported by elastic supporting elements extending along the same axis of rotation. Consequently, it is possible to obtain a higher twisting moment, and hence a greater movement of rotation out of the plane of the sensor xy, and in this way obtains a higher sensitivity of the sensor.

In addition, the presence of the further elastic anchorage elements 8b, located outside the driving mass 3, enables increase of the stiffness of the driving mass 3 in regard to the movements out of the plane of the sensor xy, and so an increase in the decoupling between the driving movement and the movements of detection.

Even though the described gyroscope represents a considerable improvement over other gyroscopes of a known type, it is not altogether optimized in respect of manufacturing simplicity, size reduction, efficiency in terms of electrical characteristics, and immunity to disturbance.

BRIEF SUMMARY

One embodiment is a microelectromechanical (MEMS) gyroscope that is improved in regards to sensitivity to external stresses and robustness in regard to disturbance. The MEMS gyroscope includes a die, having a substrate and a frame, where the frame has a detection region and a first side extending along a first horizontal axis. The MEMS gyroscope also includes a driving mass, anchored to the substrate via elastic anchorage elements, set in the detection region, and designed to be rotated in a plane with a movement of actuation about a vertical axis, and a first pair and a second pair of first sensing masses, suspended inside, and coupled to, the driving mass via respective elastic supporting elements so as to be fixed with respect thereto in the movement of actuation and perform a detection movement of rotation out of the plane in response to a first angular velocity. The first sensing masses of the first pair and the first sensing masses of the second pair being aligned in respective directions, having non-zero inclinations of opposite sign with respect to the first horizontal axis.

BRIEF DESCRIPTION OF THE SEVERAL VIEWS OF THE DRAWINGS

For a better understanding of the present disclosure, preferred embodiments thereof are now described purely by way of non-limiting example and with reference to the attached drawings, wherein.

DETAILED DESCRIPTION

As will be described in detail hereinafter, an aspect of the present disclosure envisages providing a microelectromechanical gyroscope having an arrangement of the sensing masses such as to enable an increase in the sensitivity of the sensor and in general an improvement of its electrical characteristics.

Figure 4:
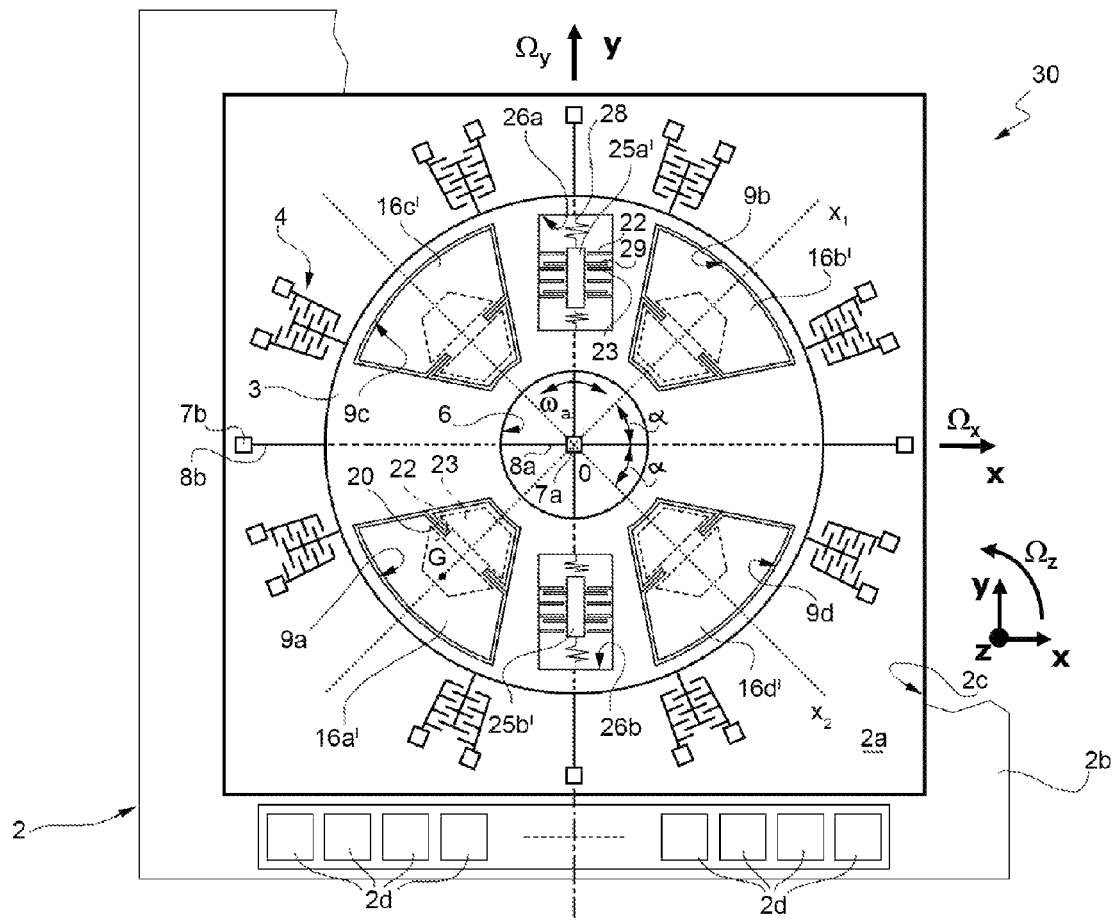
FIG. 4 shows a schematic top plan view of a microelectromechanical gyroscope according to a first embodiment of the present disclosure.

As is shown in FIG. 4, where the same reference numbers are used for indicating elements similar to others already described with reference to FIG. 1, the microelectromechanical gyroscope, here designated by 30, differs from the gyroscope 1 of FIG. 1 substantially on account of a different arrangement of the first sensing masses, here designated by 16$a'$-16$d'$, and of the second sensing masses, here designated by 25$a'$, 25$b'$.

In greater detail, the first sensing masses 16$a'$, 16$b'$ of the first pair are aligned in a first diametric direction $x_1$, inclined with respect to the first horizontal axis x of the die 2 by an angle of inclination α (considered in a counterclockwise direction), the value of which is preferably 45°. Likewise, the first sensing masses 16$c'$, 16$d'$ of the second pair are aligned in a second diametric direction $x_2$, substantially orthogonal to the first diametric direction $x_1$, and inclined with respect to the first horizontal axis x by the same angle of inclination α (considered in this case in an opposite direction, namely clockwise). The first sensing masses 16$a'$-16$d'$ are consequently aligned in respective diametric directions, which are inclined with respect to the pitch and roll axes, about which the pitch angular velocity $\vec{\Omega}_x$ and the roll angular velocity $\vec{\Omega}_y$ are applied, and moreover inclined with respect to the sides of the die 2 (and to the horizontal axes x, y).

In addition, the first sensing masses 16$a'$, 16$b'$ of the first pair are symmetrical to corresponding sensing masses 16$d'$, 16$c'$ of the second pair, with respect to the axis of symmetry of the die pads 2$d$ (coinciding with the second horizontal axis y).

The second sensing masses 25$a'$, 25$b'$ are arranged in the available space left free by the first sensing masses 16$a'$-16$d'$, and are, for example, aligned along the second horizontal axis y (as illustrated in FIG. 4). It may thus be noted that the arrangement of the first and second sensing masses in FIG. 4 derives, as compared to the arrangement of the same masses of FIG. 1, from a counterclockwise rotation through the angle of inclination α about the center O.

The present applicant has found that the aforesaid arrangement of the first and second sensing masses 16$a'$-16$d'$, 25$a'$, and 25$b'$ makes it possible to achieve a series of advantages, amongst which a simplified connection of the corresponding first and second sensing electrodes 22, 23 towards the die pads 2$d$.

In particular, a first processing channel in the electronic read interface and corresponding electrical connections to the connection pads 2$d$ are associated to the first pair of first sensing masses 16$a'$, 16$b'$, whilst associated to the second pair of first sensing masses 16$c'$, 16$d'$ are, in the same electronic read interface, a second and distinct processing channel, and corresponding electrical connections to the respective connection pads 2$d$.

Figure 1:
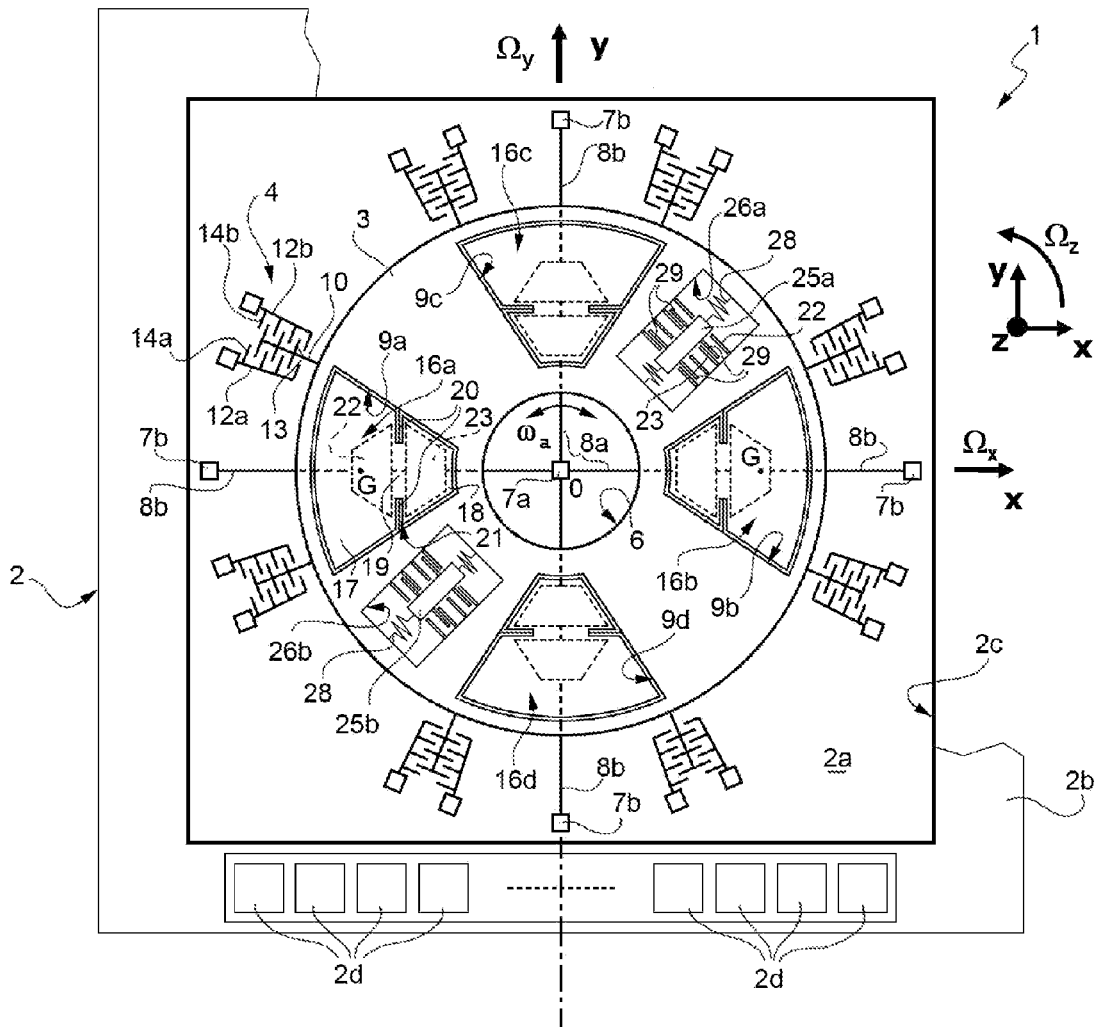
FIG. 1 shows a schematic top plan view of a microelectromechanical gyroscope, of a known type.
Figure 2:
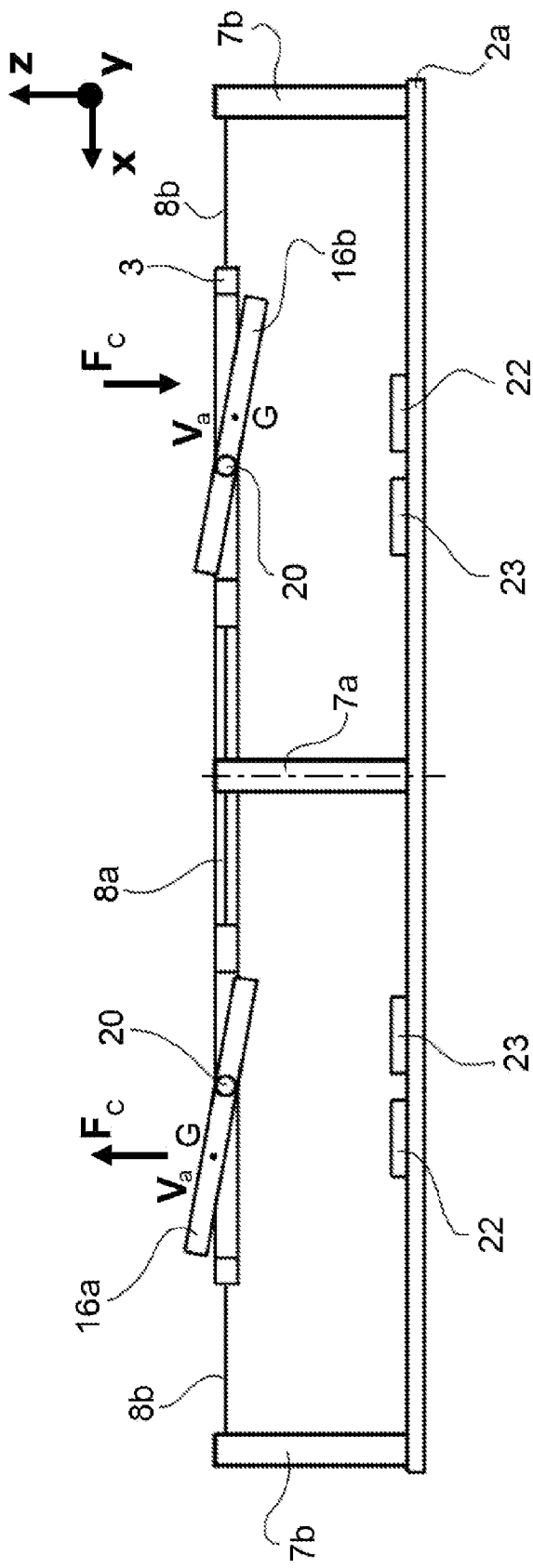
FIGS. 2 and 3 show, respectively, a schematic lateral cross-sectional view and a schematic top plan view, of parts of the gyroscope of FIG. 1, in the presence of a Coriolis force.
Figure 3:
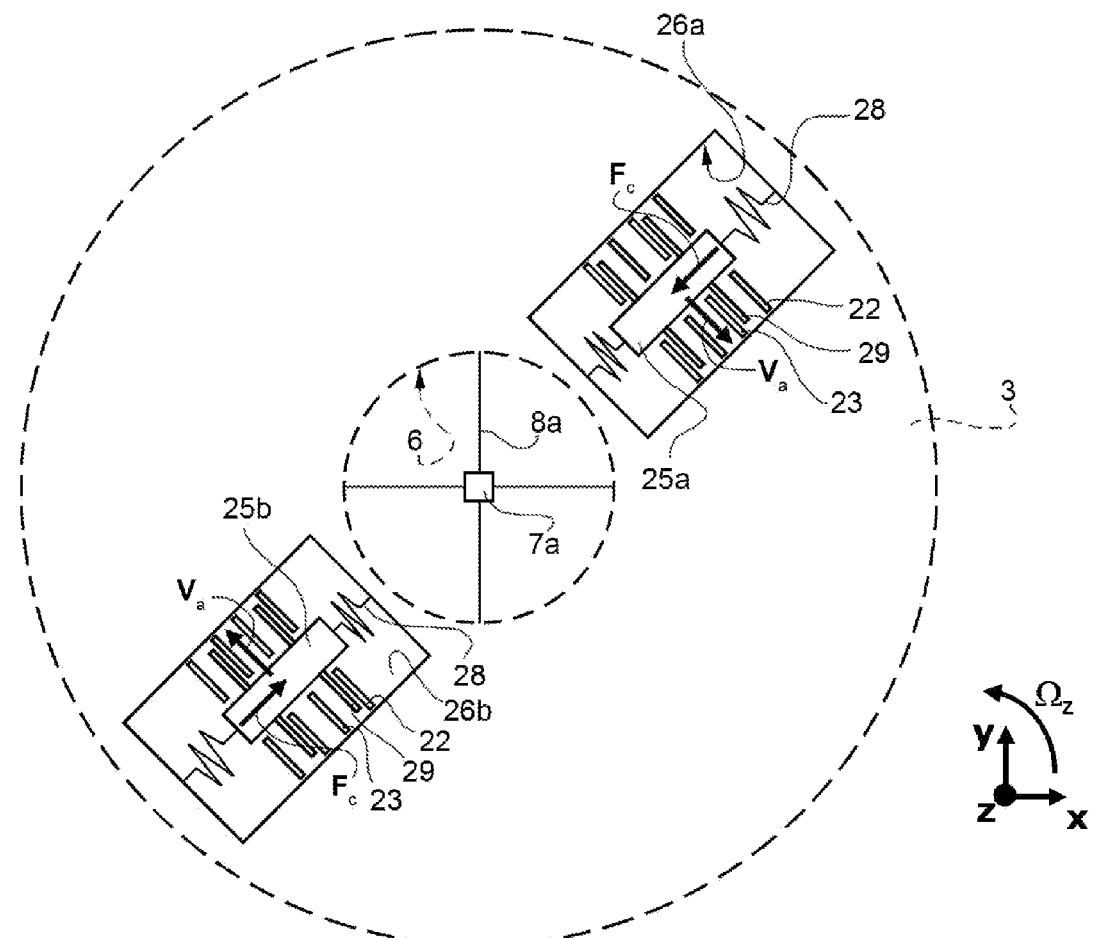

The present applicant has found that in the arrangement of a known type shown in FIG. 1, the position of the first sensing masses 16$a$-16$d$ with respect to the connection pads 2$d$ of the die 2 shows a marked lack of uniformity (as do the corresponding electrical connections to the same connection pads 2$d$). In fact, the two pairs of first sensing masses 16$a$-16$d$ are mutually positioned in an asymmetrical way with respect to the axis of symmetry of the connection pads 2$d$, thus calling for a different design of the electrical connections for the two processing channels. Consequently, the reading performance referred to the two axes of detection (of pitch and roll) may be different, and possibly must be compensated for by the electronic read interface (which is consequently more complex).

Instead, the arrangement described in FIG. 4 for the first sensing masses 16$a'$-16$d'$ with respect to the connection pads 2$d$ makes it possible to obtain a substantial symmetry of the electrical connections to the connection pads 2$d$ for the two processing channels (the two pairs of first sensing masses are in fact set in an altogether symmetrical way with respect to the axis of symmetry of the connection pads 2$d$). The symmetry of the electrical connections enables considerable advantages to be obtained in terms of uniformity in the electrical characteristics (for example, in terms of active and parasitic capacitances, or leakage currents) and robustness to the spread of the parameters resulting from the manufacturing process.

Advantageously, the arrangement described enables an increase of the symmetry also of the electrical connections referred to the second sensing masses 25$a'$, 25$b'$, thus leading to an increase of uniformity in the electrical characteristics of the corresponding read electronics. In particular, the arrangement of the second sensing masses 25$a'$, 25$b'$ guarantees a substantial symmetry of the overall structure with respect to the axis of symmetry of the connection pads 2$d$, thus further simplifying the design of the electrical connections.

Figure 5:
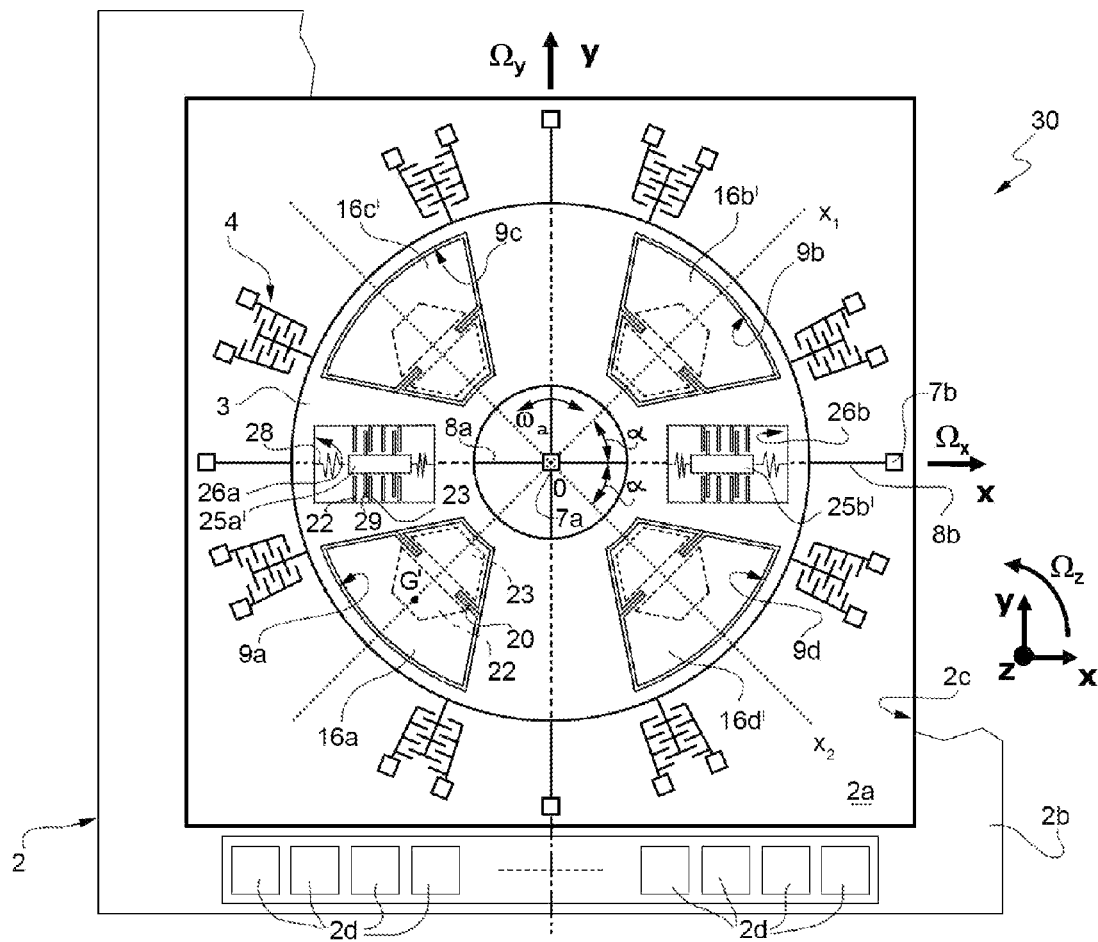
FIG. 5 shows a schematic top plan view of a second embodiment of the microelectromechanical gyroscope.

FIG. 5 shows a variant embodiment of the gyroscope 30, which differs from the one shown in FIG. 4 in so far as the second sensing masses 25$a'$, 25$b'$ are aligned along the first horizontal axis x, instead of along the second horizontal axis y. Also in this case, the same considerations made previously still apply. In particular, this configuration intuitively enables a further increase in the symmetry of the detection structure with respect to the axis of symmetry of the die pads 2$d$.

The present applicant has found that the aforesaid arrangement of the first and second sensing masses 16$a'$-16$d'$, 25$a'$, and 25$b'$ also optimizes exploitation of the space available in the gyroscope for detection of the angular velocity.

The area available for providing the detection structures, coinciding with the open region 2$c$ defined by the frame 2$b$ of the die 2, in fact usually has a square shape (as is shown in FIG. 4 and in FIG. 6) or a rectangular shape. The arrangement of the first sensing masses 16$a'$-16$d'$ in directions inclined with respect to the sides of the frame 2$b$ and to the horizontal axes x, y enables increase of the dimensions and maximization of the sensitivity of the first sensing masses, exploiting for detection the areas at a greater distance from the axis of rotation of actuation.

Figure 6:
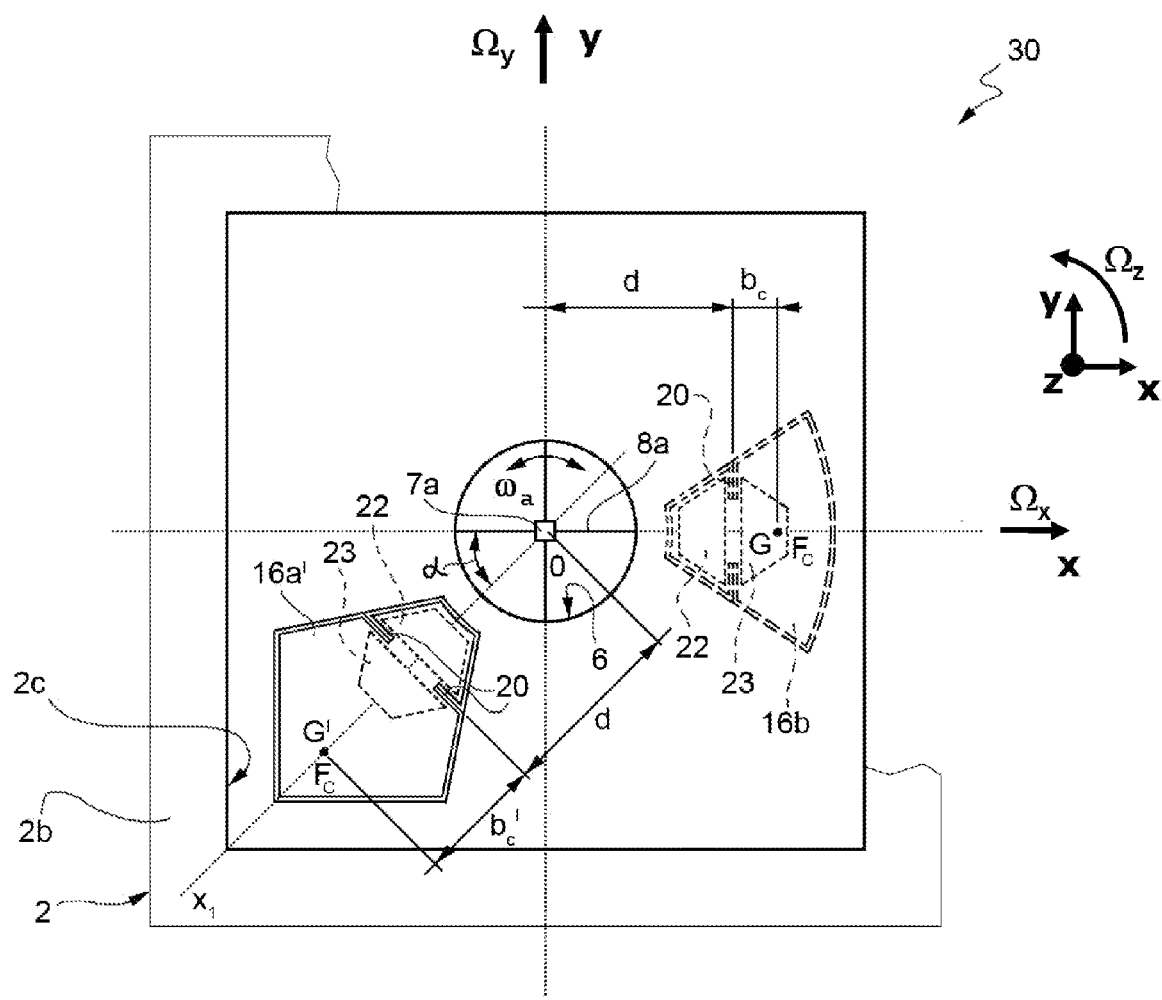
FIG. 6 shows the schematic comparison between a portion of the microelectromechanical gyroscope, in a further variant embodiment thereof, and a corresponding portion of a sensor.

In greater detail, and as is shown in FIG. 6, which represents in a simplified way just the area available (open region 2c) of the gyroscope 30 and a first sensing mass (for example, the first sensing mass 16a'), the conformation of the first sensing masses 16a'-16d' can in this case be modified so as to improve exploitation of the space available in a radial direction, until the internal edges of the frame 2b are approached. In a way not illustrated, also the conformation of the driving mass 3, within the overall dimensions of which the sensing masses are housed, is in this case modified.

In particular, represented with a solid line is a variant embodiment of the first sensing mass 16a', having in this case a generally rhomboidal shape extending towards an internal edge of the frame 2b and its center of gravity G' located at an arm $b_C'$ from the first elastic supporting elements 20. In FIG. 6, illustrated with a dashed line, purely to facilitate a comparison between the different solutions, is a first sensing mass of a traditional type (for example, the first sensing mass 16b of FIG. 1), having the shape, described previously, of a radial sector. The first sensing mass 16b of a traditional type has its center of gravity G located at an arm $b_C$ from the respective first elastic supporting elements 20. Both of the first sensing masses illustrated are located at one and the same radial distance d between the respective first elastic supporting elements 20 and the center O.

This comparison highlights the fact that the arm $b_C$ of the traditional sensing mass has a value visibly smaller than that of the arm $b_C'$ that can be obtained in the new configuration. In particular, the increase of the distance of the center of gravity G' of the first sensing masses 16a'-16d' from the center O enables an increase in the driving velocity $\vec{v}_a$ felt by the same first sensing masses (given the same angle of rotation of the driving mass 3), and hence an increase in the Coriolis force $F_C'$, given that this force is directly proportional to the driving velocity $\vec{v}_a$. In addition, since the Coriolis force $F_C'$ is applied at a greater arm $b_C'$, the value of the resulting twisting moment increases.

In addition, this configuration allows to have available a greater surface for the sensing electrodes 22, 23. In general, it is thus clear that this configuration enables, with appropriate design choices, a considerable increase in the sensitivity of detection.

The present applicant has also found that the aforesaid arrangement of the first and second sensing masses 16a'-16d', 25a', and 25b' makes it possible to obtain, using an appropriate configuration of the electronic read interface, a further increase in the sensitivity of the gyroscope 30.

In detail, the gyroscope 30, shown in FIGS. 4 and 5, has the peculiarity of having the axes of detection in the plane of the sensor xy (coinciding with the first and second diametric directions $x_1$, $x_2$ of alignment of the first sensing masses 16a'-16d') inclined by the angle α with respect to the horizontal axes x and y about which the pitch angular velocity $\vec{\Omega}_x$ and the roll angular velocity $\vec{\Omega}_y$ act.

Instead of envisaging assembly of the die 2 rotated by a corresponding angle α at the level of package or board, which would evidently make it possible to re-orient the axes of detection according to the original directions of pitch and roll (i.e., the horizontal axes x and y), a further aspect of the present disclosure envisages to suitably combine at the electronic read interface level the detection signals coming from the first sensing masses 16a'-16d'. In particular, the detection signals are combined so as to re-obtain, starting from the capacitive variations associated to the displacements of the first sensing masses 16a'-16d', voltage outputs corresponding to the original pitch and roll directions (i.e., to the horizontal axes x and y).

In the case where the angular velocity to be detected about the first horizontal axis x or the second horizontal axis y, a unit value is considered for simplicity:

$$\Omega_x = 1°/S; \Omega_y = 1°/S$$

and each pair of first sensing masses 16a'-16d' has a unit sensitivity S:

$$S_x = 1 \frac{mV}{°/s};$$

$$S_y = 1 \frac{mV}{°/s}$$

Intuitively, in the case of a traditional configuration (for example, of the type illustrated in FIG. 1, having first sensing masses 16a-16d aligned along the horizontal axes x, y), the following voltage values would be obtained at an output from the electronic read interface:

$$V_{out,x} = 1 \text{ mV}; V_{out,y} = 1 \text{ mV}$$

where $V_{out,x}$ (is the output voltage corresponding to the first pair of first sensing masses 16a, 16b aligned along the first horizontal axis x, and $V_{out,y}$ is the output voltage corresponding to the second pair of first sensing masses 16c, 16d aligned along the second horizontal axis y (in the traditional solution).

In particular, as described previously, an angular velocity (of pitch or roll) about one of the horizontal axes x, y would determine a capacitive unbalancing of a single pair of first sensing masses 16a-16d (in particular the pair aligned about the same horizontal axis).

Instead, in the new configuration illustrated in FIG. 4 or in FIG. 5, an angular velocity (of pitch or roll) about one of the horizontal axes x, y determines a capacitive unbalancing of both of the pairs of first sensing masses 16a', 16b' and 16c', 16d', in so far as they are sensitive to the components of the angular velocities of pitch and roll along the diametric directions $x_1$ and $x_2$, and these components have a non-zero value for both of the pairs. Given the same geometry and distance from the center O of the first sensing masses 16a'-16d', in this case the following total output voltages for the horizontal axes x, y are obtained:

$$V_{out,x} = V_{out,x1} + V_{out,x2} = \frac{1}{\sqrt{2}} mV + \frac{1}{\sqrt{2}} mV = \sqrt{2} \, mV$$

$$V_{out,y} = V_{out,x1} + V_{out,x2} = \frac{1}{\sqrt{2}} mV + \frac{1}{\sqrt{2}} mV = \sqrt{2} \, mV$$

where $V_{out,x1}$ and $V_{out,x2}$ are the output voltages corresponding to the first pair and, respectively, to the second pair of first sensing masses 16a'-16d', aligned, respectively, in the first and second diametric directions $x_1$, $x_2$.

Consequently, although the capacitive unbalancing of the single first sensing masses referred to a given angular velocity is smaller by a factor $1/\sqrt{2}$ with respect to the corresponding unbalancing in a traditional configuration, it is possible to sum (via a purposely configured read interface) the contributions of all four of the first sensing masses referred to the same angular velocity, and obtain a global increase in the sensitivity of the gyroscope 30 by a factor $\sqrt{2}$.

Figure 7:
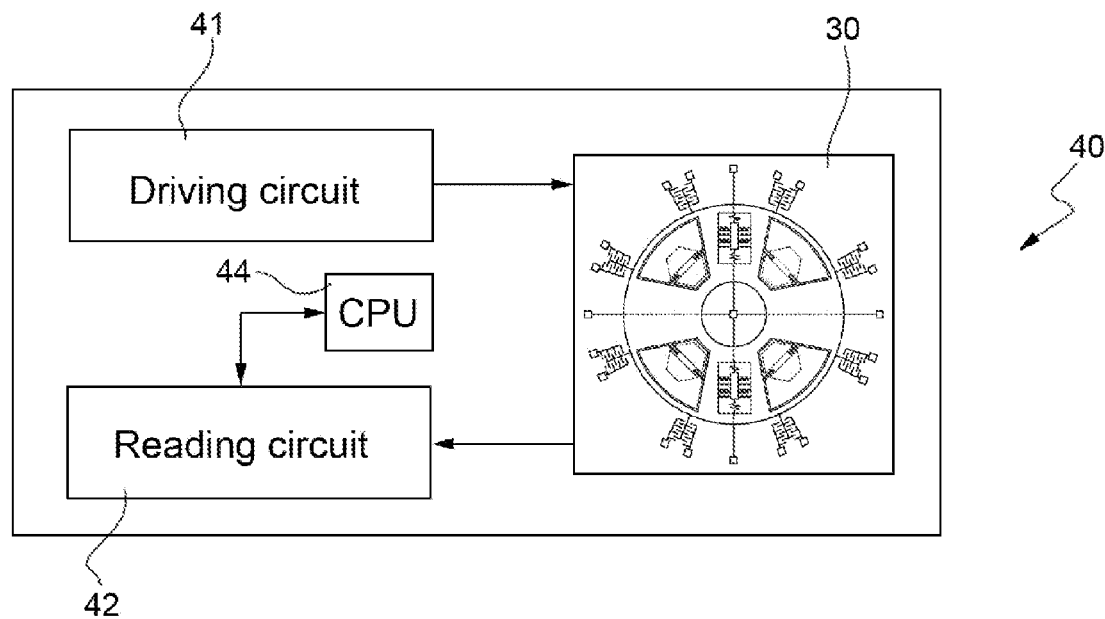
FIG. 7 shows a simplified block diagram of an electronic device provided with the microelectromechanical gyroscope according to the present disclosure.

FIG. 7 illustrates an electronic device 40, which comprises the microelectromechanical gyroscope 30 described previously. The electronic device 40 can advantageously be used in a plurality of electronic systems, for example, in inertial navigation systems, in automotive systems, or in systems of a portable type, such as, for example: a PDA (Personal Digital Assistant); a portable computer; a cell phone; a digital audio player; a photographic camera or a camcorder; or further systems capable of processing, storing, transmitting, and receiving signals and information.

The electronic device 40 further comprises: a driving circuit 41, operatively coupled to the driving assembly 4 for imparting the rotary driving movement to the driving mass 3, and supplying biasing signals to the microelectromechanical structures; a read circuit 42, operatively coupled to the sensing electrodes 22, 23 of the first and second sensing masses, for detecting the amount of displacement of the same sensing masses and hence determining the angular velocities acting on the structure; and an electronic control unit 44, for example, of a microprocessor type, connected to the read circuit 42, and designed to supervise the general operation of the electronic device 40, for example, on the basis of the angular velocities detected and determined. In particular, the read circuit 42 includes the aforesaid electronic read interface, designed to appropriately combine the output signals corresponding to the individual first sensing masses, in order to increase the sensitivity of detection, as described previously.

The advantages of the microelectromechanical gyroscope provided according to the present disclosure are clear from the foregoing description.

In any case, it is once again emphasized that the configuration of the sensing masses makes it possible to optimize exploitation of the area available for detection, increase the sensitivity of the sensor, and improve uniformity of the electrical characteristics and the robustness of the system to disturbance. More in general, this configuration allows improving the characteristics and the electrical performance of the microelectromechanical gyroscope.

Finally, it is clear that modifications and variations can be made to what has been described and illustrated herein, without thereby departing from the scope of the present disclosure.

In particular, it is evident that the new configuration of the first sensing masses can advantageously be provided for a gyroscope that is only biaxial, i.e., not sensitive to yaw angular velocity (and hence without the second sensing masses $25a'$, $25b'$).

For specific design requirements, the value of the angle α may differ from the value described, and be, for example, comprised between 40° and 50°. The angles of inclination of the two pairs of first sensing masses $16a'$-$16d'$ with respect to the first horizontal axis x may also not be the same, the two pairs of first sensing masses having in any case opposite inclination with respect to the first horizontal axis x, but in this case no longer be symmetrical with respect to the second horizontal axis y. In addition, the two diametric directions $x_1$ and $x_2$ may not be orthogonal to one another.

In addition, the die pads $2d$ can extend in a different direction, for example, along the second horizontal axis y.

In a per-se known manner, the displacement of the sensing masses can be determined with a technique different from the capacitive one, for example, by detection of a magnetic force.

In addition, the twisting moment for causing oscillation of the driving mass with rotary movement can be generated in a different way, for example, by means of parallel-plate electrodes, or else by magnetic actuation.

More in general, it is evident that the configuration of some structural elements of the gyroscope may be different. For example, the driving mass 3 may have a shape different from the circular one, such as a generally closed polygonal shape, as likewise the shape of the frame $2b$ of the die 2 can be different. Alternatively, it is possible to envisage a different arrangement of the first elastic anchorage elements of the driving mass 3 (which must be in any case able to perform decoupling of the driving mass from the motion of detection), or of the second elastic supporting elements 28 (which must be in any case such as to enable the radial movement of the sensing masses of the second type). In addition, a different configuration of the sensing electrodes associated to the sensing masses of the first and second types can be envisaged.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An integrated microelectromechanical structure, comprising:
   a die including a substrate and a frame, the frame defining a detection region and having a first side extending along a first axis of a plane that includes a second axis;
   elastic anchorage elements;
   a driving mass anchored to said substrate via the elastic anchorage elements, set in said detection region, and configured to be rotated in the plane with a movement of actuation about a third axis transverse to the plane;
   elastic supporting elements; and
   a first pair and a second pair of first sensing masses, suspended inside, and respectively coupled to, said driving mass, via the elastic supporting elements so as to be fixed with respect to the driving mass in said movement of actuation and perform a detection movement of rotation out of said plane in response to a rotation of the structure at a first angular velocity; said first pair and said second pair being aligned in respective directions having non-zero inclinations of opposite sign with respect to said first axis.

2. The structure according to claim 1 wherein said first sensing masses of said first pair are aligned in a first direction inclined with respect to said first axis by an angle, and said first sensing masses of said second pair are aligned in a second direction inclined by the same angle, on an opposite side with respect to said first axis.

3. The structure according to claim 2 wherein said angle has a value substantially equal to 45°.

4. The structure according claim 1, further comprising a plurality of die pads extending along said first side of said frame in a symmetrical way with respect to the second axis; wherein each of said first sensing masses of said first pair is arranged symmetrically to a corresponding one of said first sensing masses of said second pair and on opposites sides of said second axis.

5. The structure according to claim 4, further comprising:
a plurality of pairs of sensing electrodes associated respectively with the sensing masses of the first and second pairs, each pair of sensing electrodes being configured to form a respective one of a plurality of sensing capacitors; and
electrical connections between said respective sensing electrodes and respective ones of said die pads; wherein the electrical connections for the respective sensing electrodes associated with said first sensing masses of said first pair are set symmetrically to the electrical connections for the respective sensing electrodes associated with said first sensing masses of said second pair, with respect to said second axis.

6. The structure according to claim 1 wherein said frame has a second side extending along the second axis and defining an edge with said first side; wherein at least one first sensing mass of said first and second pairs is shaped to have an end that corresponds to the edge of the frame, along a respective one of said first direction and said second direction.

7. The structure according to claim 6 wherein said at least one first sensing mass has a generally rhomboidal shape, elongated along said respective one of said first direction and said second direction.

8. The structure according to claim 1 wherein said rotation of the structure at said first angular velocity is about said first axis, which is configured to coincide with a first axis of detection of said structure.

9. The structure according to claim 8, of a biaxial type, wherein said first sensing masses of said first pair and second pair are also designed to perform said detection movement of rotation out of said plane in response to a rotation of the structure at a second angular velocity, applied in use about the second axis, orthogonal to said first axis and coinciding with a second axis of detection of said structure.

10. The structure according to claim 9, of a triaxial type, further comprising:
elastic supporting element; and
a pair of second sensing masses, suspended inside, and respectively coupled to, said driving mass via the elastic supporting elements so as to be fixed with respect to the driving mass in said movement of actuation and so as to perform a linear movement of detection in said plane in response to a rotation of the structure at a third angular velocity about said third axis; wherein said second sensing masses are aligned along one of said first axis and second axis.

11. The structure according to claim 1 wherein said frame has a generally square or rectangular shape, with first sides parallel to said first axis and second sides parallel to the second axis, orthogonal to said first axis.

12. The structure according to claim 1 wherein said driving mass defines a central empty space, the structure further comprising:
a first anchorage set at a center of said empty space and fixed to the substrate;
first elastic anchorage elements extending inside said empty space and between the driving mass and the first anchorage;
a plurality of second anchorages set outside of said driving mass and fixed to the substrate; and
second elastic anchorage elements extending between the driving mass and the second anchorages, respectively; wherein said elastic supporting elements and said first and second elastic anchorage elements are configured in such a way that said driving mass is decoupled from said first sensing masses in said detection movement of rotation out of said plane.

13. The structure according to claim 1 wherein said first sensing masses have radial sector shapes.

14. An electronic device comprising:
an integrated microelectromechanical structure, further comprising:
a die including a substrate and a frame, the frame defining a detection region and having a first side extending along a first axis of a plane that includes a second axis;
elastic anchorage elements;
a driving mass anchored to said substrate via the elastic anchorage elements, set in said detection region, and configured to be rotated in the plane with a movement of actuation about a third axis transverse to the plane;
elastic supporting elements; and
a first pair and a second pair of first sensing masses, suspended inside, and respectively coupled to, said driving mass, via the elastic supporting elements so as to be fixed with respect to the driving mass in said movement of actuation and perform a detection movement of rotation out of said plane in response to a rotation of the structure at a first angular velocity; said first pair and said second pair being aligned in respective directions having non-zero inclinations of opposite sign with respect to said first axis; and
a read stage, operatively coupled to said structure.

15. The electronic device according to claim 14, further comprising a central processing unit and a driving circuit coupled to the structure.

16. The electronic device according to claim 14 wherein said first sensing masses of said first pair are aligned in a first direction inclined with respect to said first axis by an angle, and said first sensing masses of said second pair are aligned in a second direction inclined by the same angle, on an opposite side with respect to said first axis.

17. The electronic device according to claim 16 wherein said angle has a value substantially equal to 45.

18. The electronic device according to claim 14 wherein the structure includes a plurality of die pads extending along said first side of said frame in a symmetrical way with respect to the second axis; wherein said first sensing masses of said first pair are arranged symmetrically to a corresponding one of said first sensing masses of said second pair and on opposite sides of said second axis.

19. The electronic sensing device according to claim 18 wherein said read stage is connected to said die pads for receiving electrical signals from each of said first sensing masses, and is configured to combine said electrical signals and generate a first electrical output quantity and a second electrical output quantity, which are a function, respectively, of the first angular velocity applied about said first axis and a second angular velocity applied about the second axis, orthogonal to said first axis.

20. A method of forming an integrated microelectromechanical structure, comprising:
forming a die having a substrate and a frame having a first side extending along a first axis of a plane that includes a second axis;
forming a detection region in the frame;
forming elastic anchorage elements;
anchoring a driving mass to the substrate via the elastic anchorage elements in the detection region, the driving mass configured to be rotated in a plane with a movement of actuation about a third axis transverse to the plane;

forming elastic supporting elements; and forming a first pair and a second pair of first sensing masses, suspended inside, and respectively coupled to, the driving mass via the elastic supporting elements so as to be fixed with respect to the driving mass in the movement of actuation and perform a detection movement of rotation out of the plane in response to a rotation of the structure at a first angular velocity; the first pair and the second pair being aligned in respective directions having non-zero inclinations of opposite sign with respect to the first axis.

21. The method of claim 20, further comprising:

aligning the first sensing masses of the first pair in a first direction inclined with respect to the first axis by an angle; and aligning the first sensing masses of the second pair in a second direction inclined by the same angle, on an opposite side with respect to the first axis.

22. The method of claim 21 wherein the angle has a value substantially equal to 45.

23. The method of claim 20, further comprising:

forming a plurality of die pads along the first side of the frame in a symmetrical way with respect to the second axis; wherein the first sensing masses of the first pair are arranged symmetrically to a corresponding one of the first sensing masses of the second pair and on an opposite side the second axis.

\* \* \* \* \*